United States Patent

[11] 3,596,155

[72] Inventor James T. Huxtable
Peoria, Ill.
[21] Appl. No. 860,654
[22] Filed Sept. 24, 1969
[45] Patented July 27, 1971
[73] Assignee Caterpillar Tractor Co.
Peoria, Ill.

[54] LOAD-BALANCING CIRCUIT FOR PARALLEL DC MOTORS
6 Claims, 2 Drawing Figs.

[52] U.S. Cl. .................................................. 318/100, 318/71
[51] Int. Cl. .................................................. H02p 5/46
[50] Field of Search .......................................... 318/98, 99, 100, 68, 71, 77, 112

[56] References Cited
UNITED STATES PATENTS
2,412,069 12/1946 Trinks .......................... 318/71
2,523,120 9/1950 Kenyon ........................ 318/99
3,205,966 9/1965 Landers ........................ 318/68

Primary Examiner—Oris L. Rader
Assistant Examiner—Thomas Langer
Attorney—Fryer, Tjensvold, Feix, Phillips & Lempio ABSTRACT: A load-balancing system for paralleled DC motors wherein the field of a separate exciter is connected between the armature circuits of a pair of motors while the armature of the separate exciter is coupled to the fields of the motors to reduce the load unbalance between the motors.

PATENTED JUL 27 1971 3,596,155

INVENTOR
JAMES T. HUXTABLE

BY
Fryer, Tjensvold, Feix, Phillips & Lempio
ATTORNEYS

LOAD-BALANCING CIRCUIT FOR PARALLEL DC MOTORS

BACKGROUND OF THE INVENTION

The present invention relates to a method and apparatus for maintaining electrical balance between parallel-connected DC motors that are subject to variations in torque loading as, for example, the traction motors in an electrically driven vehicle. This invention is particularly adapted to ensure electrical balance under normal operating conditions of parallel separately excited motors.

At the present time most electrically driven vehicles using DC motors employ series DC motors that inherently balance the load when operated in parallel. Thus, there is no need for complicated external control circuits for maintaining a balance between the various traction motors.

While series DC motors will inherently balance the load, in some applications it is advantageous to use separately excited motors as traction drive motors. However, separately excited motors without an external balancing system will not share the load equally when operated in parallel.

In the past in applications using parallel-connected separately excited motors, it has been a practice to incorporate large series windings in the motor and to employ external switch gear for the series windings to effect a load balance. While such systems are capable of achieving the desired balance, they do have several disadvantages. For example, the large series windings increase the physical size and weight of the motor which is undesirable when the motors are used as traction or drive motors in vehicles. Also, the external switch gear for such windings must be large enough to handle the high series field currents which also adds to the complexity of the overall control.

While the increased size and weight of the drive equipment can be tolerated in some applications, such as railroad locomotives which tend to normally travel in the same direction within a relatively limited speed range, these characteristics are not suitable in other applications, such as earth-moving equipment. Further, in the case of earth-moving equipment, it is often necessary to effect rapid reversals in the direction of travel of the equipment, which requires that the external switch gear be capable of effecting reversal of very high currents. While it is possible to design switch gear which can effect this rapid reversal of currents, it will necessarily impose high-current duty cycles on the switch gear. As a result, expensive switch gear must be used and extensive servicing of the gear is usually necessary. Also, the switching of high currents also increases the possibility of serious accidents if the switch gear fails.

SUMMARY OF THE INVENTION

The present invention solves the above problems by providing separately excited direct current motors with a simplified control system for maintaining a load balance between the drive motors. The field windings of the two motors are each divided into separate halves with the one-half of the field winding of one motor being coupled in series with one-half of the field winding of the other motor and the field of a separate exciter is coupled between the armature circuits of the two motors to sense any unbalance in the current flowing between the two armatures since any unbalance of the armature current flow is directly related to an unbalance in the torque load on the two motors. As a consequence, the resulting current flow in the field will vary the current flow in the armature of the separate exciter which is coupled between the common junction of the series-connected half-fields of the two drive motors so the current flow from the armature of the separate exciter through the drive motor fields will be in the direction to rebalance the current flow through the armature of the two drive motors.

The separate exciter functions to cumulatively compound the motors during motoring operation and differentially compound them during the braking operation.

The invention also includes means in the armature circuit of the separate exciter for reversing the current flow through the motor fields. Thus, when the direction of rotation of the traction motors is reversed, the direction of current flow through the separate exciter can also be reversed so that the separate exciter can balance the torque loads under both forward or reverse motoring and braking conditions. The reversal of the current flow through the armature of the separate exciter is conventionally accomplished by relay-operated switches or a switch that is operated in conjunction with the reversing controls on the vehicle.

BRIEF DESCRIPTION OF THE DRAWINGS

The present invention will be more easily understood from the following detailed description of the preferred embodiment when taken in conjunction with the attached drawing in which.

PREFERRED EMBODIMENT

Figure 1:
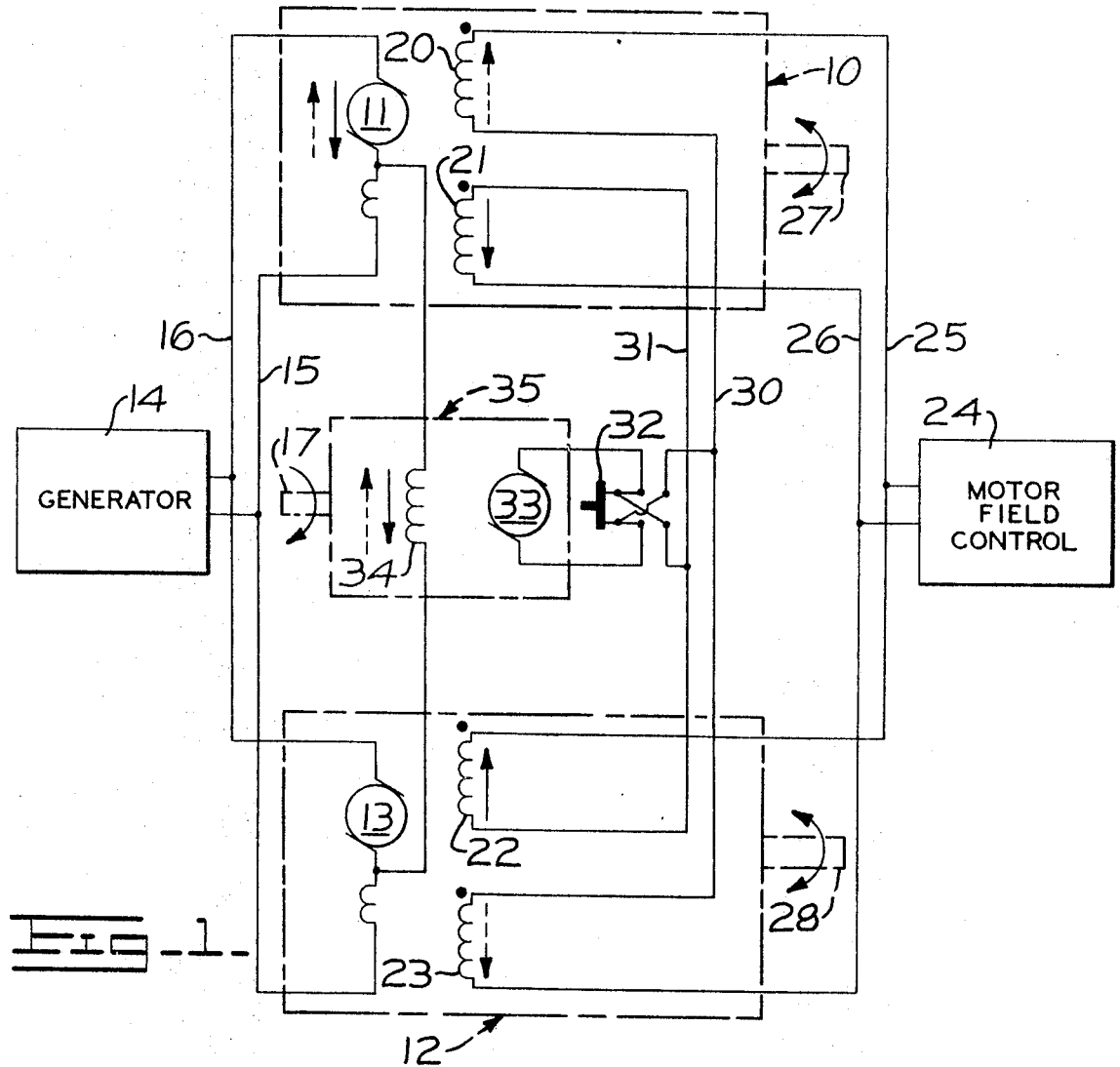
FIG. 1 is a schematic drawing of the present invention.

As briefly explained above, the present invention is particularly adapted for balancing the torque loads between separately excited parallel DC traction motors in electric drive vehicles, particularly suited for use with earth-moving equipment wherein the equipment is accelerated and decelerated at frequent intervals and reversed in its direction of travel. The drive system generally comprises a generator which is coupled to the two drive motors connected in parallel. The field of the generator is controlled so that it will operate as a generator when the vehicle is being driven and operate as a motor to absorb power from the motors when the vehicle is decelerated (during power regeneration). These changes in current flow are accomplished by changing the excitation level of the generator field. In addition, controls are provided for reversing the direction of current flow through the generator field so that the direction of travel of the vehicle can be conveniently reversed.

The motors shown in the drawings are separately excited DC motors with the excitation level of their fields being controlled. In a motoring condition or in a braking (decelerating) condition, these motors will have their respective excitation levels adjusted accordingly. Since the drive system utilizes separately excited drive motors, means are necessary to balance the torque load between the motors, which is the subject of the instant invention.

Employing conventional control systems having external switch gear with series windings to balance the torque load between parallel drive motors is not feasible in applications where it is necessary to reverse high-current flow through the drive motor fields. Such an application is electric drive, earth-moving vehicles wherein the current flow in the traction dr ve motors is normally very high which would require extremely large switch gear to handle the current loads with extreme duty cycles on the switching contacts.

Referring to FIG. 1, two vehicle drive motors 10 and 12 for a vehicle are shown enclosed with broken lines which have armatures 11 and 13, respectively. The motor armatures are disposed in a parallel circuit configuration and coupled by means of leads 15 and 16 to the generator 14. Generator 14 is preferably designed to be driven at a constant speed by a prime mover (not shown in FIG. 1) and is controlled by means of an external field control circuit which varies the current in the field of the generator to change its output. The drive shaft 17 of the balancing exciter is conventionally driven in common with the generator through a common drive train (not shown).

The separately excited field winding of the motor 10 is divided into two halves, field windings 20 and 21, and similarly the field winding of the motor 12 is divided into two halves, field windings 22 and 23. For the purpose of discussion, the several field windings have their positive end marked with a dot. Further, the field windings of the two motors are connected in parallel by means of leads 25 and 26 to a motor field control 24 as illustrated and output shafts 27 and 28 of drive motors 10 and 12 are respectively geared to separate final drive trains in the equipment being driven by the motors. For example, in the case of earth-moving equipment, this could be two individual wheels of the vehicle through accompanying reduction gearing. As pointed out, while the invention can be employed in earth-moving equipment, it can also be applied to other types of equipment using parallel-connected DC drive motors which require frequent changes in speed and reversals of rotational direction, as well as starting and stopping. For example, it could be used in load balancing between drive motors used in large rolling mills or the like.

The field winding 34 of a separate exciter 35 (a DC generator) is connected between the armature circuits of the two motors 10 and 12 as illustrated and it is desirable that the exciter be driven at a relatively constant speed so that the variation in the speed of the exciter will not change the balancing of the torque loads between the two drive motors. The armature 33 of the exciter is coupled to a double-pole, double-throw switch 32 which in turn is coupled by leads 30 and 31 to the field windings of the motors 10 and 12.

Figure 2:
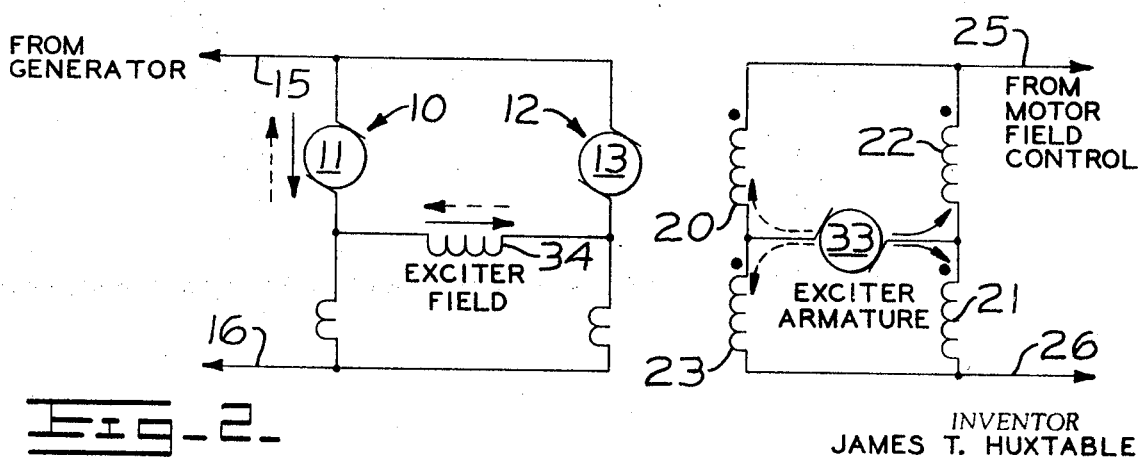
FIG. 2 is a simplified schematic drawing showing the operation of the present invention.

Referring now to FIG. 2 which shows the electrical connections between the exciter 35 and the circuits of the motors 10 and 12 in simplified form so the general circuit construction will be apparent. More particularly, the generator leads 15 and 16 are coupled to the motor armature circuits which are disposed in a parallel arrangement while the exciter field 34 is coupled directly between the two armature circuits as shown. The two halves 20 and 21 of the field winding of the drive motor 10 and the two halves 22 and 23 of the field winding of the drive motor 12 are connected so the half winding 20 of the field winding of drive motor 10 is coupled in series with the half winding 23 of the field winding of the drive motor 12. Similarly, the half winding 22 of the field winding of the drive motor 12 is coupled in series with the half winding 21 of the field winding of the drive motor 10. With the two half windings of each motor field windings connected as shown, the current flow from the exciter armature will be in opposite directions through the field windings. Thus, the load on one drive motor will be increased while the load on the other will be decreased if there is current flow through the armature of the exciter. The serially connected halves of the fields are disposed in a parallel arrangement between the two leads 25 and 26 which are coupled to the motor field control 24, which is designed to control excitation level of the field windings of the drive motors to provide the desired speed and torque whether in a motoring or braking mode of operation. Of course, in a motoring mode the field winding will be excited at a level so that the motors operate to drive the vehicle, while in the braking mode (during power regeneration) the field windings are excited at a level so that the drive motors act as generators to generate a current which can then be used to motorize the generator 14 thereby dynamically braking the vehicle, through its prime mover. The armature 33 of the exciter is connected between the common connection of the serially connected motor fields as shown in FIG. 2.

OPERATION OF PREFERRED EMBODIMENT

The operation can be easily understood by referring to FIG. 2 wherein the solid arrows indicate current flow when the drive motors are operated in one direction as traction motors and armature current in motor 10 is high. The dotted arrows indicate current flow when the motors are operating in the same direction as generators to dynamically brake the vehicle, assuming that armature current in motor 10 is high. If the direction of rotation of the motors were reversed so would be the exciter field current flow for the previously described conditions. Further, it is assumed that, due to unbalances between the two drive motors, the motor 10 has a larger armature current because of the parallel connection with generator 14.

When in the motoring mode, the larger current flow through the armature circuit of the motor 10 will cause current to flow through the exciter field winding towards the armature circuit of the motor 12. Current flow through the exciter field winding will induce a current flow in the armature of the exciter in the direction shown by the solid arrows in the right-hand portion of FIG. 2. As shown, this current flow will be in a direction to decrease the current flow through the field 22 while increasing the current flow through the field 21. Also, the current flow through the field winding 23 will be decreased while the current through the field winding 20 will be increased. The increasing of the current flow through the field windings 20 and 21 will tend to decrease the power output of the motor 10 and thus tend to reduce armature current in the motor 10 to balance or rebalance the load between the two motors. When the loads are balanced the current flow will be equal in the armatures of both motors and there will be no current flow through the exciter armature since there will be no current flow in the field winding of the separate exciter. Of course, if the motor 12 is carrying a larger armature current, current flow from the exciter will be opposite to that described above and the current flow in the field windings 22 and 23 of the motor 12 will be increased and thus decrease the armature current of the motor 12 until dynamic balance is again achieved.

When the two traction motors are operated as generators in a dynamic braking mode, current flow will be in the opposite direction for each of the assumed conditions described above. Further, if one assumes that the motor 10 is supplying a larger current, the resulting increased current flow will be represented by the dotted arrows shown in FIG. 2. This will induce a current flow in the field 34 of the exciter in the direction shown by the dotted arrow. This current flow will tend to decrease the current flow in the field winding of the motor 10 while increasing the current flow in the field winding of the motor 12. This will result in a decrease in the armature current of the motor 10 and a resulting increase in the armature current from the motor 12. This, of course, will rebalance the load distribution between the two motors when they are operating as generators (during power regeneration).

The switch 32 which is illustrated as being a double-pole, double-throw switch, could be replaced by a relay-operated switch which would be automatically operated by the reverse controls on the vehicle. Through such an arrangement when the operator places the controls in a position to reverse the direction of rotation of the drive motors, the switch 32 would also be automatically shifted to change the connections between the armature 33 and field windings of the motors. In the reverse mode wherein the connections are reversed by the switch, the motors would operate in the same manner as described above whether they are operated as motors or generators. Also, the separate exciter will operate in the same manner as described above and balance the loads between the two motors for reverse operating conditions.

From the above description it can be appreciated that a relatively simple control has been provided for maintaining a load balance between the two separately excited DC motors operated in parallel. The system in effect cumulatively compounds the motors during the motoring mode of operation and differentially compounds the motors during the braking mode of operation. The control system uses a single exciter which is driven by the prime mover that drives the generator 14 and does not require any external switch gear capable of handling large currents. Further, the control is automatic and requires no complicated sensor circuits or controllers to achieve the balance. These features enable the use of a control system which is simple, low cost and maintenance free. Such characteristics are desirable in electrically driven vehicles, especially for vehicles which are subject to rugged environments, such as earth-moving equipment and the like.

I claim:

1. A load-balancing system for paralleled DC motors, each of said motors having a field winding divided into two half windings, said system comprising:

a separate exciter having an armature and field winding, said exciter field winding being coupled between the armatures of said motors;

first circuit means connecting one half winding of one motor field winding in series with one half winding of the other field;

second circuit means connecting the remaining half winding of said motor field windings in series;

third circuit means connecting said armature of said separate exciter between said first and second circuit means so that current from said exciter flows through said motor fields in opposite directions; and a separate controlled source with leads connecting said first and second circuit means in parallel with said separate controlled source whereby the excitation levels created by said series connected remaining windings are respectively assisted and reduced by current flow in said series connected windings in said first circuit means when any load unbalance occurs.

2. The system of claim 1 wherein said separate exciter is provided with switch means for reversing the flow of current through the armature of the separate exciter when the direction of rotation of said DC motors is reversed.

3. The load-balancing system of claim 1 wherein said separate exciter is driven at a substantially constant speed.

4. The load-balancing system of claim 1 wherein said DC motors are the traction motors of an electrically driven vehicle.

5. The load-balancing system of claim 4 wherein said vehicle includes a prime mover drivingly connected to a DC generator, said generator supplying power to the armatures of said DC motors, said prime mover also being drivingly connected to said separate exciter and governor means on said prime mover to operate it at a substantially constant speed.

6. A method for balancing the load between two DC motors with their armatures connected in parallel to a generator, said method comprising:

dividing the field windings of each motor in two halves, connecting a one-half field winding of one of said motors in series to a one-half field winding of said other motor and in parallel to a controlled external excitation source, connecting the remaining one-half field windings of said motors in series and in parallel to said controlled external excitation source, sensing any unbalance in current flow between said armatures of said motors, and utilizing said unbalance to generate a separate current between said series connected one-half field windings whose amplitude is related to sensed unbalance and whose direction in said series connected one-half windings respectively assists and reduces excitation level of said remaining one-half windings in said motors excited from said controlled external source in a manner to balance the load.